(No Model.)
C. ANDERSON.
DRAFT EQUALIZER.
No. 465,310. Patented Dec. 15, 1891.
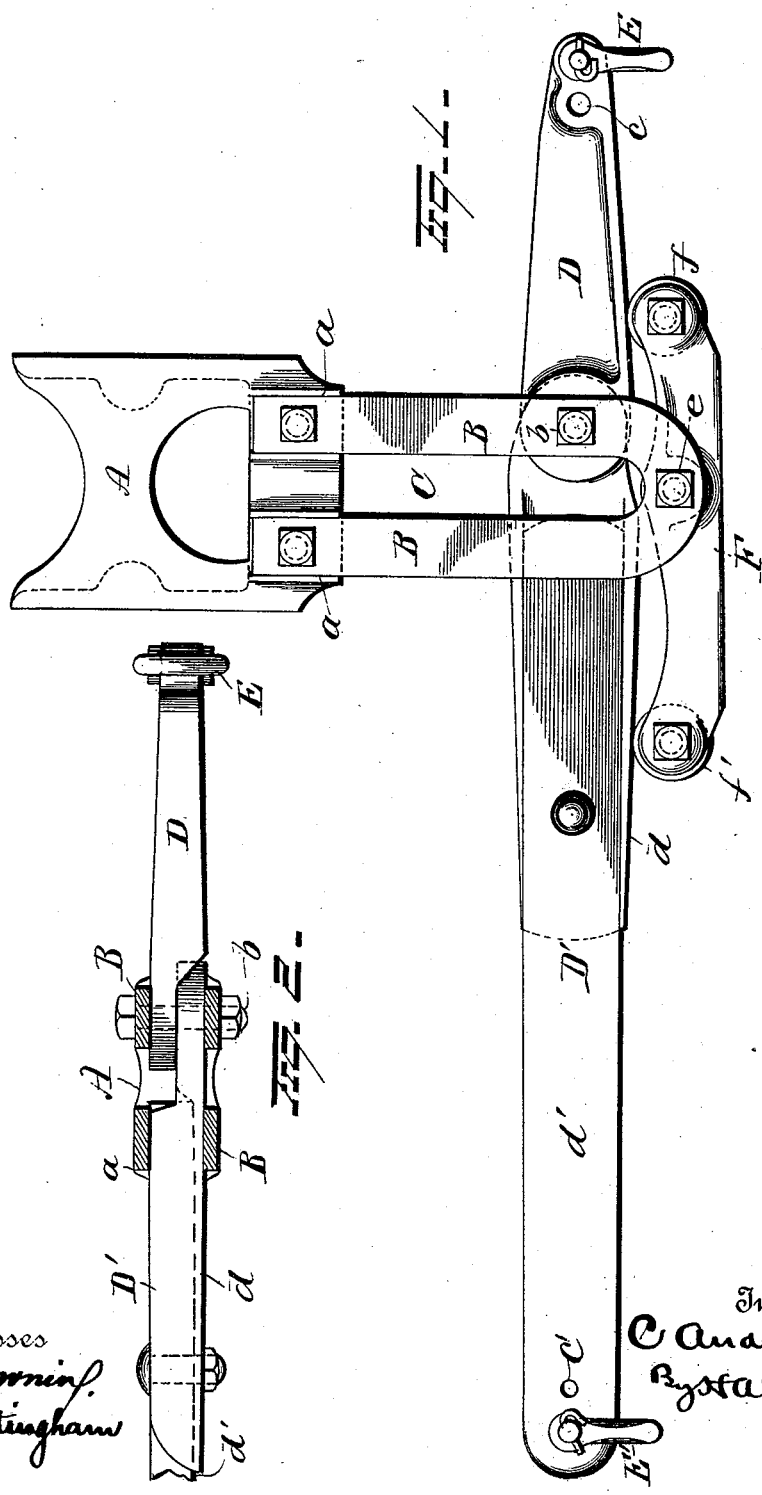

UNITED STATES PATENT OFFICE.

CHARLES ANDERSON, OF SOUTH BEND, INDIANA, ASSIGNOR TO THE SOUTH BEND IRON WORKS, OF SAME PLACE.

DRAFT-EQUALIZER.

SPECIFICATION forming part of Letters Patent No. 465,310, dated December 15, 1891.

Application filed July 30, 1891. Serial No. 401,211. (No model.)

*To all whom it may concern:*

Be it known that I, CHARLES ANDERSON, a citizen of South Bend, in the county of St. Joseph and State of Indiana, have invented certain new and useful Improvements in Draft-Equalizers; and I do hereby declare the following to be a full, clear, and exact description of the invention, such as will enable others skilled in the art to which it appertains to make and use the same.

My invention relates to an improvement in draft-equalizers, and more particularly to such as are adapted for use on plows, the object of the invention being to produce a simple draft-equalizer to permit the attachment to the plow of four horses abreast, and which shall comprise a small number of parts and be effectual in the performance of its function of equalizing the draft.

With this object in view the invention consists in certain novel features of construction and combinations and arrangements of parts, as hereinafter set forth, and pointed out in the claims.

In the accompanying drawings, Figure 1 is a plan view of my improved equalizer. Fig. 2 is a sectional view of the same.

A represents a spacing-block adapted for attachment to the forward end of the plow beam or frame and provided at its forward end in both faces of said block with recesses $a$ for the reception of the rear ends of two U-shaped plates B B, which are secured to said blocks by means of bolts or otherwise, and together constitute a U-shaped frame C, which extends forwardly from the forward end of the block A. A pair of equalizing-bars D D' are adapted to lap at their inner ends, where they are perforated for the reception of a pin $b$, which also passes through one side of the U-shaped frame C, near the forward end thereof, and thus pivotally connects said equalizing-bars to the U-shaped frame, said bars being adapted to project in opposite directions, as shown in Fig. 1.

The arm or equalizing-bar D is preferably made of metal and considerably shorter than the bar D', said bar D being preferably grooved or ribbed to give it strength. The free end of the bar D is provided with a series of perforations $c$, whereby a clevis E may be adjustably connected to it. The longer arm or equalizing-bar D' is preferably made in two parts $d\ d'$, the inner part $d$ being made of metal and provided with a socket or recess for the reception of the inner end of the part $d'$, which is preferably made of wood, said parts $d\ d'$ being securely bolted or riveted together. The outer end of the arm or bar D' is also provided with a series of perforations $c$, whereby a clevis E' may be attached adjustably thereto. The forward or curved ends of the plates, constituting the U-shaped frame C, are perforated for the reception of a pivot-pin $e$, on which a grooved or ribbed lever F is mounted. The fulcrum of the lever F is preferably at one side of its center, preferably at the side nearest the short arm or bar D. The free ends of the lever F are bifurcated for the reception of rollers $f\ f'$, which are mounted therein, the roller $f$ being adapted to run on the forward edge of the short arm or bar D, and the roller $f'$ being adapted to run on the long arm or bar D'.

One pair of horses is attached to the clevis E of the short arm or bar D, one of said pair of horses being permitted to walk in the furrow, and the other pair of horses is attached at the clevis E' at the free end of the arm or bar D'. Thus it will be seen that the four horses are permitted to walk abreast. Should the horses attached to the long bar pull ahead of those on the short bar the leverage of the short arm or bar is thereby increased, enabling the horses attached to it to readily regain their position in line, and the same is true with the other bar as the case may be, the lever F acting as an invariable equalizer.

Having fully described my invention, what I claim as new, and desire to secure by Letters Patent, is—

1. In an equalizer, the combination, with a pair of draft-bars pivotally supported, of a lever supported in proximity to the draft-bars, said parts disconnected from and having sliding contact with one another, substantially as set forth.

2. The combination, with a support, of draft-bars pivoted thereto and a lever pivoted to the support forward of the bars, its ends being free and overlapping the bars and forming movable bearings therefor, substantially as set forth.

3. The combination, with a frame, of a long and a short equalizing-bar pivotally connected to one side of said frame with the same pin, and a lever pivotally supported at a point between its ends, its free ends adapted to bear against said bars, substantially as set forth.

4. The combination, with a frame and equalizing-bars pivotally connected thereto at their inner ends, of a lever pivoted to said frame, and rollers in the ends of said levers adapted to bear against said equalizing-bars, substantially as set forth.

5. The combination, with a frame and equalizing-bars pivotally connected to said frame at their inner ends, of a lever pivoted at one side of its center to the end of said frame adapted to bear against said equalizing-bars, substantially as set forth.

6. The combination, with a frame and two equalizing-bars pivotally connected thereto by the same pin and at one side of said frame, of a lever pivoted in line with the center of said frame, the fulcrum of said lever being at one side of its center, the free ends of said lever being adapted to bear against the equalizing-bars, substantially as set forth.

In testimony whereof I have signed this specification in the presence of two subscribing witnesses.

CHARLES ANDERSON.

Witnesses:
 G. R. HOCH,
 JNO. W. HARBOU.